Figure 1:
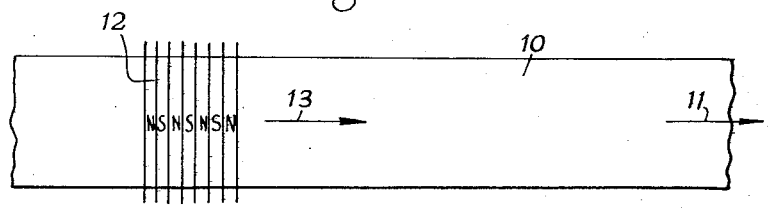

Oct. 14, 1958     F. C. WILLIAMS ET AL     2,856,573
INDUCTION MOTORS

Filed Dec. 20, 1954     7 Sheets-Sheet 1

INVENTORS
FREDERIC C. WILLIAMS
ERIC R. LAITHWAITE
BY
Stevens, Davis, Miller and Mosher
ATTORNEYS

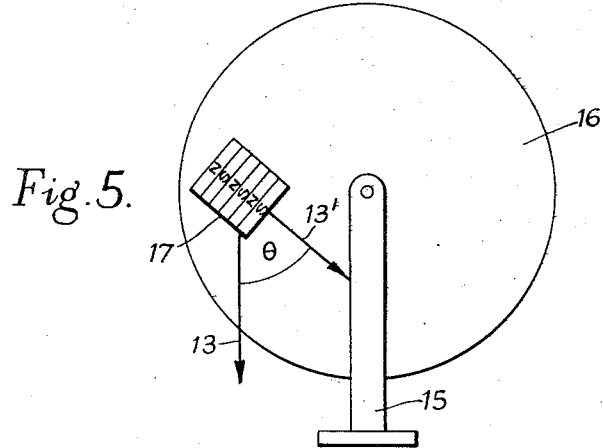
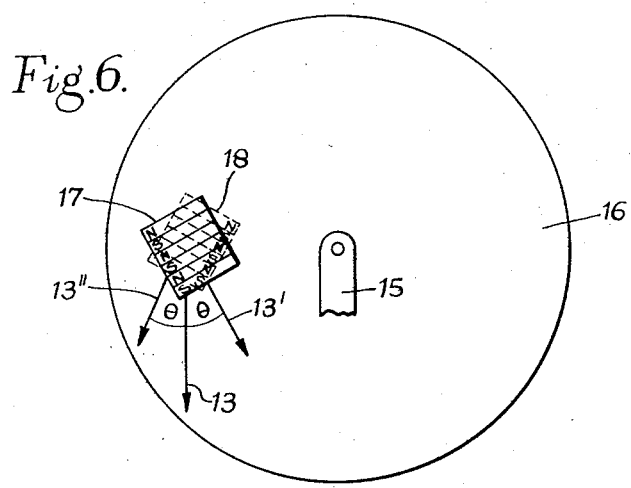

Oct. 14, 1958    F. C. WILLIAMS ET AL    2,856,573
INDUCTION MOTORS
Filed Dec. 20, 1954    7 Sheets-Sheet 3

INVENTORS
FREDERIC C. WILLIAMS
ERIC R. LAITHWAITE
BY
Stevens, Davis, Miller & Mosher
ATTORNEYS Oct. 14, 1958     F. C. WILLIAMS ET AL     2,856,573
INDUCTION MOTORS Filed Dec. 20, 1954

INVENTORS
FREDERIC C. WILLIAMS
ERIC R. LAITHWAITE

United States Patent Office 2,856,573
Patented Oct. 14, 1958

2,856,573
INDUCTION MOTORS

Frederic Calland Williams, Romiley, and Eric Roberts Laithwaite, Manchester, England, assignors to National Research Development Corporation, London, England Application December 20, 1954, Serial No. 476,446

Claims priority, application Great Britain January 1, 1954

17 Claims. (Cl. 318—243)

The present invention relates to induction motors, that is to say alternating current motors of the type including a first member comprising material of high electrical conductivity and constrained to move in a predetermined path relatively to a second member, and electromagnetic means associated with the second member for producing effectively a moving magnetic field, the arrangement being such that current induced in the said material of high electrical conductivity by the said moving magnetic field produces a further magnetic field which interacts with the first said magnetic field to cause movement of the first member along the said path. The first member usually includes ferromagnetic material in addition to the material of high electrical conductivity and is usually mounted for rotation relatively to the second member, in which case the first member is referred to as the rotor of the motor, the second member is then referred to as the stator of the motor and the path in which the first member is constrained to move is a circular path about the axis of rotation. Examples of material of high electrical conductivity are aluminium, copper and mercury.

One object of the present invention is to provide an alternating current motor of the type specified whose speed can be varied continuously from a speed substantially equal to synchronous speed over a range of speeds equal to a plurality of times the synchronous speed. For the purpose of this specification synchronous speed equals the speed of movement of the field in its direction of motion.

Another object of the invention is to provide an alternating current motor of the type specified which is capable of providing a range of speed variation a plurality of times the synchronous speed.

Yet another object of the invention is to provide an alternating current motor of the type specified whose speed can be varied continuously over a wide range without the need for changing the pole pitch and without the need for making external connections to the rotor.

According to one aspect of the invention in an alternating current motor of the type specified and of continuously variable speed over a range whose lower limit may be approximately synchronous speed, the said electromagnetic means comprise at least one group of windings and associated ferro-magnetic structure, the electromagnetic means being adapted, when the windings are appropriately energised, to produce effectively a row of magnetic poles of alternately north and south polarities moving in a direction proceeding along the row, the first member is of a structure such that it provides continuous loops of high electrical conductivity substantially conforming to the outer peripheries of the cross-sections of the bundles of flux entering the first member from the poles irrespective of the direction of movement of the poles relatively to the path in which the first member is constrained to move, irrespective of the position of the poles in the direction of movement thereof and irrespective of the position of the first member along the said path, and means are provided for enabling the direction of movement of the poles to be varied relatively to the path in which the first member is constrained to move. It has been found that a motor of this construction is readily capable of continuous speed variation over a speed range up to three or four times the synchronous speed.

In order to vary the direction of movement of the moving magnetic poles the windings and associated ferromagnetic structure may be rotated as a whole whereby the pitch of the magnetic poles need not be altered. In order to provide the said loops of high electrical conductivity the first member may be entirely of material of high electrical conductivity. In the interests of efficiency however the first member will usually include ferromagnetic material, in which case the material of high electrical conductivity may be in the form of a mesh embedded in a laminated ferromagnetic structure. The size of the mesh must be small enough to ensure that the specified loops of high electrical conductivity are provided by the mesh. The minimum speed of the motor is synchronous speed less whatever slip there may be present.

Figure 2:
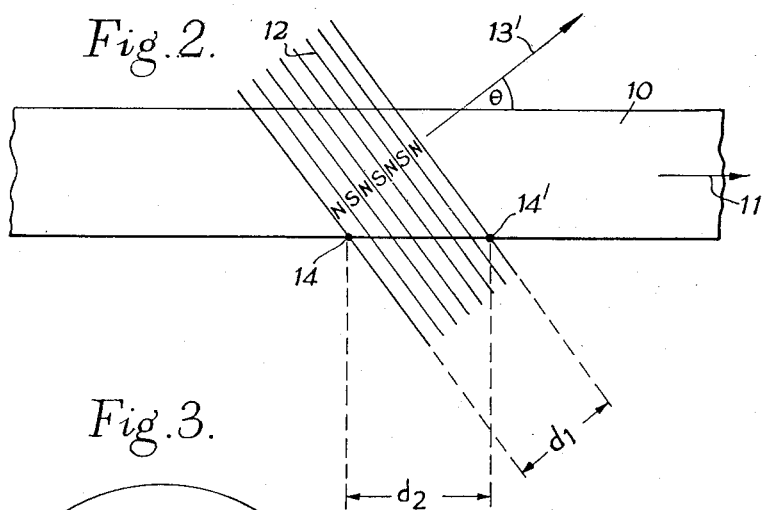
Figure 3:
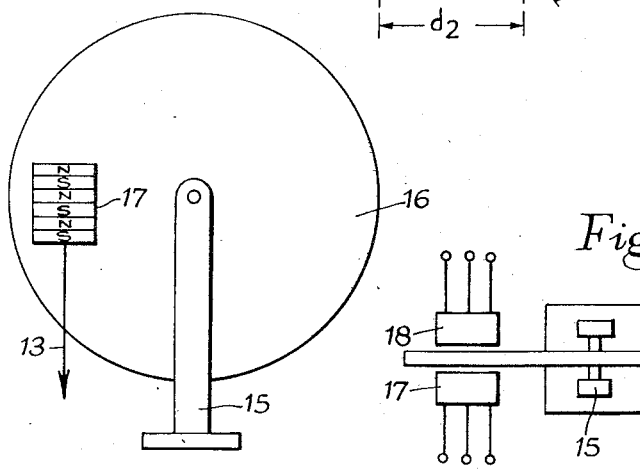
Figure 4:
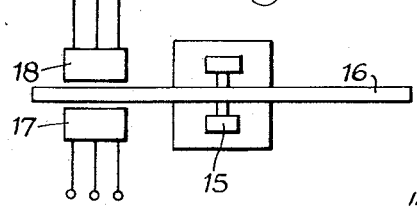
Figure 7:
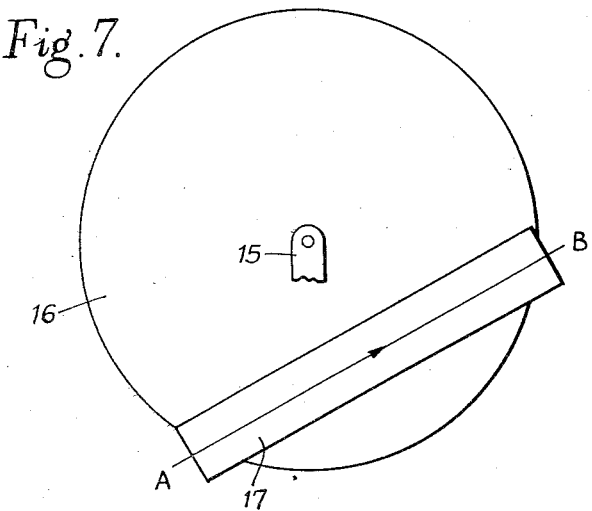
Figure 8:
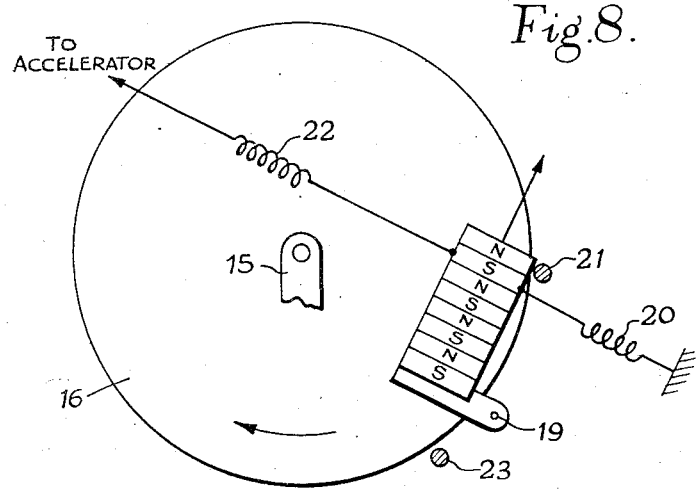
Figure 9:
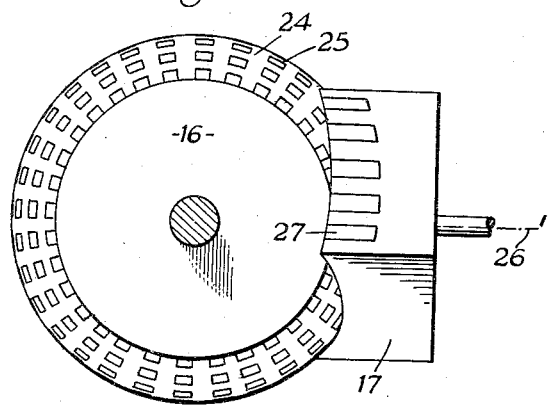
Figure 10:
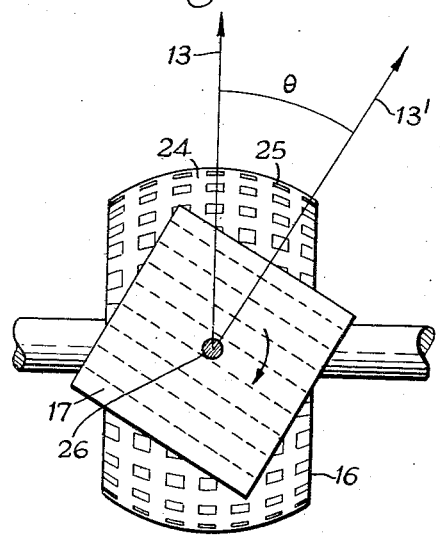
Figure 11:
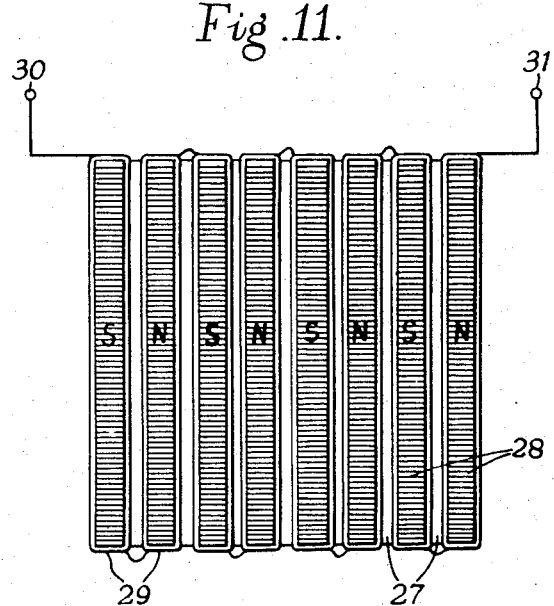
Figure 12:
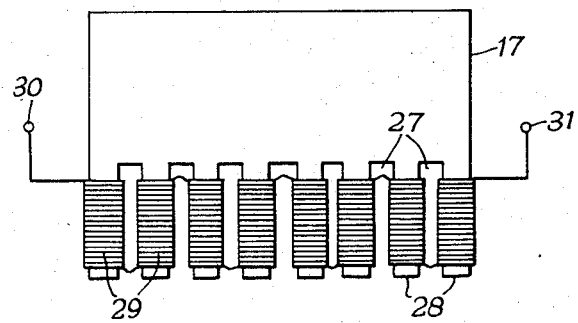
Figure 13:
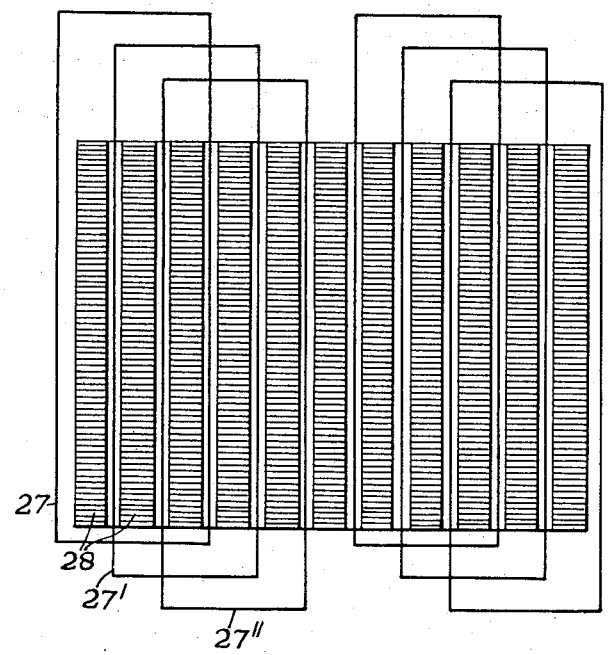
Figure 14:
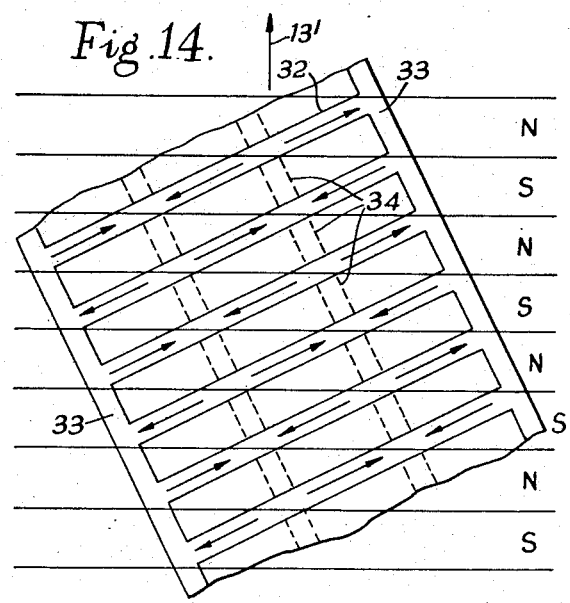
Figure 15:
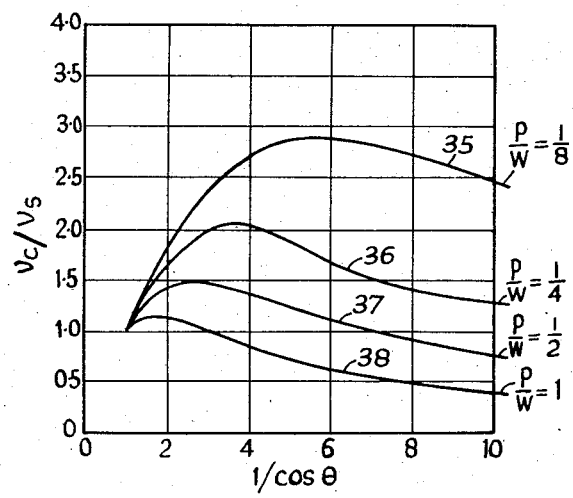

The invention will now be described by way of example with reference to the accompanying drawings in which Figs. 1 and 2 are explanatory drawings, Figs. 3, 4 and 5 are schematic drawings of one embodiment of the invention in which the rotor is of disc shape, Fig. 6 is a schematic drawing of a second embodiment of the invention employing a rotor of disc shape, Figs. 7 and 8 are schematic drawings illustrating an application of the invention to torque conversion, Figs. 9 and 10 are schematic drawings of a further embodiment of the invention employing a rotor of part-spherical shape, Figs. 11 and 12 are schematic drawings of a pole and winding structure suitable for use with single-phase alternating current supply, Fig. 13 is a schematic drawing of a pole and winding structure for use with three-phase alternating current supply, Fig. 14 is an explanatory drawing, and Fig. 15 is an explanatory diagram.

Referring to Figs. 1 and 2, the principle underlying the present invention may be understood by considering a flat strip of copper 10 constrained to move endwise in a straight line as indicated by the arrow 11. If a row 12 of magnetic poles of alternately north and south polarity is caused to move along the path in which the copper strip is constrained to move as indicated by the arrow 13 in Fig. 1, the copper strip will tend to move with the poles and to reach a speed approaching the speed of movement of the poles. Considering now the effect of keeping the speed of movement of the poles constant and varying their direction of movement in the plane of the strip, Fig. 2 shows the same poles 12 and copper strip 10 with the direction of movement 13' of the poles at an angle $\theta$ to the direction of movement 11 of the copper strip. It can be shown that if any point in the strip is at any instant in the bundle of flux from any one of the poles, the strip will tend to move at a speed which will keep that point in the given bundle of flux. Thus if the bundle of flux moves in a given time through a distance $d_1$ shown in Fig. 2, a point 14 in the strip will tend to move to a position 14' in the same time, that is to say through a distance $d_2$ where $d_2 = d_1/\cos \theta$. The velocity of the strip therefore tends to equal $v/\cos \theta$ where $v$ is the velocity of the moving field. It will be appreciated that as $\theta$ approaches 90° the speed of movement of the strip theoretically tends to infinity. Thus a wide variation in speed is possible by varying $\theta$.

Referring to Figs. 3 and 4, these show an induction motor of continuously variable speed comprising a frame 15 constituting the aforesaid second member and journalled for rotation in the frame a disc 16 of copper which constitutes the aforesaid first member. The disc may include inserts (not shown) of ferromagnetic material. Electromagnetic means in the form of two ferromagnetic structures 17 and 18 and associated windings are provided on the frame and constitute the aforesaid electromagnetic means. The disc may be of about 12″ in diameter and each of the structures 17 and 18 may be approximately 2.1″ square when viewed in the axial direction of the rotor. The structures 17 and 18 are mounted facing one another on opposite sides of the disc as shown in Fig. 4, the separation being just sufficient to enable the disc to rotate in the gap between them. The centres of the structures may be about 5″ from the centre of the disc.

Each of the structures 17 and 18 may be in the form of a stack of laminations having slots therein to accommodate the windings. The number of slots may be 11 to accommodate conventional three-phase windings whereby the pitch of the poles produced is about ½″ and each pole has a width of about 2.1″. Conventional three-phase windings are provided and energised from a source of 3-phase alternating current in a manner (which will be apparent to those skilled in the art) such that the magnetic poles produced are of alternately N and S polarity and move in a direction proceeding along the row of poles. The manner in which the windings are energised is made such that if at any instant the polarity of a pole on one of the structures 17 and 18 is N the polarity of the corresponding pole in the other group is S.

The two structures 17 and 18 are mounted by any suitable means (not shown) for rotation as a whole about an axis at right-angles to the plane of the disc whereby they can be moved continuously from a position in which the directions of movement of their associated magnetic poles are tangential to the disc to a position in which the direction of movement of the poles are radial to the disc.

The slowest speed of rotation of the disc is produced when the direction of movement of both sets of poles is tangential to the disc. Figure 3 shows the relative positions of the disc 16 and the structure 17 in this condition. The arrow 13 denotes the direction of motion of the intsantaneous pole distribution shown. By rotating the structures 17 and 18 as a whole in the same sense, the speed of rotation of the disc is increased. A typical position is shown in Figure 5.

If the structures 17 and 18 are rotated in opposite senses, the resulting field pattern can be shown to be travelling tangentially to the disc at a speed greater than the speed of travel of the field which would be produced by one group of poles alone, this method also producing an increased speed of rotation of the disc. Figure 6 shows the relative positions of the structures 17 and 18 for this mode of operation. Speed variations of more than 2:1 have been found to be obtainable for both these modes of operation.

It will be appreciated that the speed of rotation of the discs may be varied by moving the structures 17 and 18 radially inwards and outwards relatively to the disc. Thus the synchronous speed of the motor may also be varied. The range of speed variation achieved in this way is dependent upon the degree of radial movement possible and hence is dependent upon the radius of the disc and the dimensions of the structures 17 and 18.

In another form of motor according to the invention the stator may consist of a ferromagnetic structure and associated windings extending right across the disc as shown in Figure 7. It can be shown that in this case all parts of the disc under a line such as AB, have the same slip. The resulting speed of the disc is thus dependent upon the perpendicular distance of AB from the centre of the disc.

The ferromagnetic structures 17 and 18 may be such that the poles in any of the rotary forms of the invention are curved instead of straight so that at a predetermined angular setting of the structures 17 and 18, all parts of the disc under the poles have the same slip. The setting chosen to give this condition will usually be one giving a rotor speed in the region of the highest speed of the rotor.

The ratio of the width of the poles to the pitch of the poles is an important factor determining the speed variation that can be achieved and tests indicate that a ratio of 2:1 enables a fractional speed variation of 3/2 to be achieved and a ratio of 4:1 enables a fractional speed variation of as much as 2/1 to be achieved, each of these variations being relatively to synchronous speed.

Although a motor has been described in which a rotor in the form of a disc is employed it will be appreciated that the rotor may be in other forms. For example the rotor may be in the form of a sphere or part of a sphere of laminated iron in which a mesh of copper is embedded. In this form of the invention the structures 17 and 18 have concave faces concentric with the rotor and can be rotated about an axis which is radial relatively to the centre of the rotor. Figs. 9 and 10 illustrate such an arrangement, Fig. 9 being an end view and Fig. 10 an elevation. The rotor 16 is shown to be in the form of part of a sphere the copper mesh being shown at 24 surrounding projections 25 from a laminated core. As will be seen from Fig. 9 the stator has faces concentric with the spherical rotor and the group 17 is rotatable about an axis 26 which is radial relatively to the centre of the rotor. Slots 27 are for accommodating the windings (not shown) of the group 17 of poles.

In Fig. 10 the group 17 is shown turned through an angle $\theta$ from the direction 13 corresponding to minimum rotor speed.

In other forms of machine the rotor may be replaced by a continuous strip of conducting material arranged for example in the form of a conveyor belt and adapted to pass between two or more structures such as 17 and 18 previously described. Alternatively the strip of conducting material may consist of a column of electrically-conducting liquid.

It is envisaged that a motor constructed in accordance with the present invention may be used in place of a gear box as a torque convertor for transmitting power for example from the engine of a vehicle to the wheels thereof. For example the stator may be supplied from an alternator driven by the engine and the rotor may be connected mechanically to the wheels. The moving magnetic poles may be provided by a structure in the form of a flap pivoted at one end about an axis which is radially outwards of the disc as shown at 19 in Fig. 8. The pivot is arranged to be off the centre line of the flap whereby a force acting along the flap causes movement of the flap towards or away from the centre of the disc. A first spring 20 may be connected between the flap and the frame of the motor to pull the flap normally outwards from the centre of the disc against a stop 21. A second spring 22 may be connected between the flap and the accelerator (not shown) of the vehicle and in such a manner that when the accelerator is operated in a sense such as to increase the speed of the vehicle it tends to pull the flap towards the centre of the disc. It is arranged that when the rotor is stationary and the accelerator is operated so as to increase the speed of the vehicle the force acting in the flap as a result will cause the flap to remain hard against the stop 21. This position corresponds to minimum speed of the induction motor and maximum torque. As the speed of the vehicle, and hence the speed of rotation of the rotor, increases, the reaction on the flap decreases and allows the spring 22 connecting the flap to the accelerator to pull the flap towards the centre of the disc, the degree of movement of the flap being dependent upon the speed of the rotor and being limited by a further stop 23. In this way it is possible to obtain a continuous variation in torque transmission from a starting condition in which there is provided relatively high torque and relatively slow rotor speed to one in which there is provided relatively low torque and relatively high rotor speed.

Although reference has been made in the foregoing description to the use of a structure such as 17 or a pair of structures such as 17 and 18 it will be appreciated that a plurality of pairs may be employed, the two structures in each pair being arranged as already described facing one another on opposite sides of a disc and the several pairs being distributed around the disc.

One example of the structure 17 suitable for use with a single-phase alternating current supply is shown in Figs. 11 and 12. Fig. 11 is a plan view of the structure and Fig. 12 is an elevation. The structure 17 is of laminated, ferro-magnetic form and of rectangular cross-section. A plurality of slots 27 are provided in the structure and are provided with separate windings 29 which are connected in series between two terminals 30 and 31.

Windings round adjacent teeth are wound in opposite directions whereby when current is passed therethrough from the terminals 30 and 31 adjacent magnetic poles are of opposite polarities for example as shown in Fig. 1.

In common with conventional single-phase induction motors a single-phase motor according to the invention is not self-starting. It is necessary, therefore, to set the rotor in motion to start the motor. It will be appreciated that, in operation, moving magnetic poles are simulated with respect to the rotor since, for example, at synchronous speed a point in the surface of the rotor moves at a rate such that the polarity of each pole changes just as the point reaches it and hence the point appears to move with a pole of constant polarity.

It will be appreciated that the motor can be given a start in either direction of rotation of the rotor. Once it is started the speed can be varied as hereinbefore described irrespective of the direction of rotation of the rotor.

A similar structure to that shown in Figs. 11 and 12 may be used for operation from three-phase supply, the only difference lying in the formation of the windings. These may be, for example, as shown in Fig. 13 in which 11 slots are provided. By means of two sets of conventional three-phase windings such as 27, 27' and 27" the required moving poles are produced.

It will be appreciated that in all the embodiments hereinbefore described the rotor provides continuous loops of high electrical conductivity conforming to the outer peripheries of the cross-sections of the bundles of flux entering the rotor from the poles irrespective of the direction of movement of the poles relatively to the path in which the rotor is constrained to rotate, irrespective of the position of the poles in the direction of movement thereof and irrespective of the angular position of the rotor about its axis of rotation.

In the case of Figs. 3 to 8 which employ a copper disc the conditions set out in the next preceding paragraph are met since the disc provides an infinite number of loops of high electrical conductivity. In the case of Figs. 9 and 10 which employ a mesh of say copper or aluminium embedded in a ferromagnetic core, the mesh size is made substantially less that the pole pitch. Instead of one bundle of flux entering the rotor from each pole there will be a plurality of bundles, different bundles entering different ones of the core projections which are surrounded by the copper. Any flux entering the rotor through the copper itself can be ignored for all practical purposes since the flux is concentrated in the projections of ferromagnetic material.

In another form of rotor (not shown) suitable for use with the present invention each projection from the ferromagnetic rotor core is surrounded by a ring of copper, or other material of high electrical conductivity and the copper rings are not in good electrical contact with one another.

Comparing the present invention with a conventional squirrel cage motor, reference is made to Fig. 14 in which the members shown in full lines at 32 and 33 represent the copper bars and end rings respectively of a squirrel cage rotor. The moving poles shown of alternately N and S polarity are assumed to be moving in the direction 13'. As each bar 32 is at any instant being traversed by a plurality of poles of opposite polarities the E. M. F.'s induced in the bars will likewise be of opposite polarities and hence substantially zero current or current of insufficient amplitude for practical purposes will flow in the rotor bars. For the particular conditions shown in Fig. 14 it would be necessary to interconnect the bars by further conductors as shown for example in dotted lines at 34 whereby a mesh is formed as in the embodiment of the present invention described with reference to Figs. 9 and 10.

Referring now to Fig. 15, this is an explanatory diagram in which the ordinate represents the ratio of rotor speed to synchronous speed and the abscissa represents the factor $1/\cos \theta$. Curves 35 to 38 show the speed variations obtained with pole-pitch-to-pole-width ratios of 1/8, 1/4, 1/2 and 1/1 respectively. Thus where very wide speed range is required the pole-pitch-to-pole-width ratio is made small.

In some instances, however, a pole-pitch-to-pole width ratio of 1/1 may be adequate. For example if a motor is required to provide a rotor speed of 1500 R. P. M. from 50 c./s. mains and with a specified load the ratio of 1/1 may be all that is required to make up slip.

The curves shown in Fig. 15 represent speed variation obtained with a rotor having negligible leakage reactance. If leakage reactance is introduced into the rotor the range of speed variation can be substantially increased. For example a motor using a pole-pitch-to-pole-width ratio of 1/4 and a rotor having leakage reactance was found to provide a range of speed variation about equal to that shown in Fig. 15 by curve 35 which relates to a ratio of 1/8 in the case of a rotor without leakage reactance.

It will be appreciated that since a motor according to the invention is a true induction motor it may be used for other purposes for which conventional induction motors are used such as for example induction generation and drag-cut torque transmission. In considering induction generation it will be appreciated that if the rotor is driven from an external prime mover power is fed back into the mains supplying the motor. Thus in applying the motor to traction purposes the induction generation effect may be used for braking.

The invention may be applied to frequency conversion for example from 50 c./s. to 60 c./s. by applying a motor according to the invention to drive an alternator. The direction of movement of the poles relatively to the path in which the rotor is constrained to move may then be fixed and such as to provide the necessary rotor speed. The orientation of the poles in this application of the invention will usually be between either 60° and 90° relatively to the path in which the rotor is constrained to move but for some special applications angles between 0° and 45° may be necessary.

It will be appreciated that if the poles are rotated beyond the 90° position relatively to the path in which the rotor is constrained to move reversal of the direction of rotation of the rotor takes place. The theoretical speeds of the rotor for pole orientation in the vicinity of 90° is not, of course, achieved in practice. Observation has shown the useful effect, however, that torque is approximately proportional to the pole orientation relatively to 90° over a substantial range of angles centered on the 90° position. Thus a readily-reversible variable torque transmission device can be provided.

In the foregoing description and the claims appended hereto the term "bundle of flux" means a concentration of flux all in the same sense and emanating from the same pole. Thus referring to Fig. 14 and ignoring the cross connections 34 although the flux entering the squirrel cage rotor between each pair of bars 32 is encircled by the loop provided by the bars and the end rings the encircled flux is made up of groups of flux in opposite senses emanating from different poles and hence does not fall within the term a "bundle of flux."

We claim:

1. An alternating current machine comprising a first member, a second member, a source of alternating current, electromagnetic means provided on said second member and connected to said source whereby said electromagnetic means produce a row of magnetic poles not closed on itself, the width of each magnetic pole being greater than the spacing between adjacent poles, the magnetic poles effectively moving in a direction proceeding along the row, closed loops of high electrical conductivity on said first member, the current induced in said closed loops by said moving magnetic poles producing a magnetic field which interacts with the magnetic flux entering said first member to cause movement of said first member, means for constraining the movement of said first member in a predetermined direction relatively to said second member and means for varying between 0 degrees and 90 degrees the direction of movement of said moving magnetic poles relatively to the direction of movement of said first member.

2. An alternating current machine as claimed in claim 1 wherein the direction of movement of said moving magnetic poles is intermediate 45 degrees and 90 degrees relatively to the direction in which said first member is constrained to move.

3. An alternating current machine as claimed in claim 1 wherein the direction of movement of said moving magnetic poles is intermediate 60 degrees and 90 degrees relatively to the direction in which said first member is constrained to move.

4. An alternating current machine comprising a first member, a second member, a source of alternating current, electromagnetic means provided on said member and comprising a row of poles of which ratio on the pole pitch and pole width is less than unity and coils provided on said poles and connected to said source whereby said electromagnetic means produce a magnetic field moving in a direction proceeding along the row, closed loops of high electrical conductivity on said first member, the current induced in said closed loops by said magnetic field producing a further magnetic field which interacts with the said magnetic field to cause movement of said first member, means for constraining the movement of said first member in a predetermined direction relatively to said second member and means for varying the angular position of said row of poles relatively to the direction of movement of said first member.

5. An alternating current machine comprising a first member having a ferromagnetic part spherical surface, a second member, a row of poles on said second member lying in a spherical surface concentric with the part spherical surface of said first member, a source of alternating current, coils on said poles connected to said source whereby said second member produces a magnetic field moving in a direction proceeding along the row, means for enabling said second member to be rotated about an axis which passes through the common center of the part spherical surface of said first member and the spherical surface on said second member, means for mounting said first member for rotation about an axis passing through said common center and a mesh of high electrical conductivity material embedded in the ferromagnetic part spherical surface of said first member, the mesh size being substantially less than the pitch of said poles and the current induced in said mesh by said moving magnetic field producing a further magnetic field which interacts with said moving magnetic field to cause rotation of said first member.

6. An induction motor comprising a rotor consisting of a disc of high electrical conductivity arranged for rotation about an axis passing through the center of the disc, a stator consisting of a first row of stator poles positioned on one side of said disc and a second row of stator poles positioned on the other side of said disc with corresponding poles in said first and second row aligned with one another, the width of the poles of each row being greater than the spacing between adjacent poles, means for energising said first and second rows of stator poles to generate a magnetic field moving in a direction proceeding along the row to cause the rotation of said disc and means for rotating each row of poles about an axis substantially parallel to the axis of rotation of the disc.

7. An induction motor as claimed in claim 6 wherein the two rows of poles are rotated in the same direction.

8. An induction motor as claimed in claim 6 wherein the two rows of poles are rotated in opposite directions.

9. An induction motor comprising a rotor of ferromagnetic material and having part of its surface of spherical shape, a stator having at least one row of poles lying in a spherical surface concentric with the spherical surface of said rotor, a source of alternating current, coils on said poles connected to said source to produce a magnetic field moving in a direction proceeding along the row of poles, means for enabling said stator to be rotated to a limited degree about an axis which passes through the common center of the spherical surface of said rotor and the spherical surface on said stator, means for mounting the rotor for rotation about an axis passing through said common center and a mesh of high electrical conductivity material embedded in the spherical surface of said rotor, the mesh size being substantially less than the pitch of said poles.

10. An induction motor as claimed in claim 9 wherein the ratio of the pole pitch to the pole width is approximately 1.

11. An induction motor as claimed in claim 9 wherein the ratio of the pole pitch to the pole width is less than 1/2.

12. An induction motor as claimed in claim 9 wherein the ratio of the pole pitch to the pole width is less than 1/3.

13. An induction motor as claimed in claim 9 wherein the ratio of the pole pitch to the pole width is less than 1/4.

14. An induction motor as claimed in claim 9 wherein the number of poles in a row is at least four.

15. An induction machine comprising a rotor consisting of a disc of high electrical conductivity material arranged for rotation about an axis perpendicular to the plane of the disc and passing through the center of the disc, a substantially rectangular stator structure, a row of poles on said stator structure, the ratio of pole pitch to pole width of said row of poles being less than unity, means for energising said row of poles to generate a magnetic field moving in a direction proceeding along the row to cause the rotation of said rotor, means pivotally mounting said stator structure at one corner thereof, a stop for said stator structure, spring means for rotating said stator structure towards said stop whereby the direction of movement of the magnetic field is substantially tangential to said disc and means for rotating said stator structure away from said stop whereby the direction of movement of the magnetic field is towards the center of said disc and the speed of rotation of said rotor is increased.

16. An alternating current motor of variable speed over a range of speed exceeding synchronous speed, comprising a first member having paths of high electrical current conductivity, a second member having rows of poles to provide a moving magnetic field when connected to a source of alternating current, said rows of poles having a pole pitch to pole width ratio of less than unity and positioned to induce current into said paths on said first member, said paths in said first member being closed to produce a secondary magnetic field which interacts with said first magnetic field to cause motion of said first member, means constraining the movement of said first member in a predetermined direction relative to said second member and means for varying the direction of said moving magnetic field relative to the direction of motion of said first member.

17. An alternating current motor of variable speed over a range of speed exceeding synchronous speed, comprising a first member provided with intersecting paths forming closed loops of high electrical current conductivity, a second member having rows of poles to provide a moving magnetic field when connected to a source of alternating current, said rows of poles having a pole pitch to pole width ratio of less than unity and positioned to induce current into said paths on said first member to produce a secondary magnetic field which interacts with said first magnetic field to cause motion of said first member, means constraining the movement of said first member in a predetermined direction relative to said second member and means for varying the direction of said moving magnetic field relative to the direction of motion of said first member.

References Cited in the file of this patent

UNITED STATES PATENTS

| | | |
|---|---|---|
| 1,514,474 | Stewart | Nov. 4, 1924 |
| 1,559,920 | Stewart | Nov. 3, 1925 |
| 1,595,550 | Howard | Aug. 10, 1926 |
| 1,770,775 | Hall | July 15, 1930 |
| 1,855,617 | Stewart | Apr. 26, 1932 |
| 2,047,831 | Lund | July 14, 1936 |
| 2,372,590 | Ljunggren et al. | Mar. 27, 1945 |